US011921933B2

(12) United States Patent
Govindapillai et al.

(10) Patent No.: US 11,921,933 B2
(45) Date of Patent: **\*Mar. 5, 2024**

(54) INTERACTION WITH A COMPUTING DEVICE VIA MOVEMENT OF A PORTION OF A USER INTERFACE

(71) Applicant: Intel Corporation, Santa Clara, CA (US)

(72) Inventors: Vinod Govindapillai, Tampere (FI); Tomer Rider, Naahriya (IL)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/839,043

(22) Filed: Jun. 13, 2022

(65) Prior Publication Data

US 2023/0034144 A1 Feb. 2, 2023

Related U.S. Application Data

(63) Continuation of application No. 15/682,194, filed on Aug. 21, 2017, now Pat. No. 11,392,209, which is a
(Continued)

(51) Int. Cl.
*G06F 3/01* (2006.01)
*G06F 1/16* (2006.01)
(Continued)

(52) U.S. Cl.
CPC ............ *G06F 3/017* (2013.01); *G06F 1/1694* (2013.01); *G06F 3/04817* (2013.01);
(Continued)

(58) Field of Classification Search
CPC .... G06F 3/017; G06F 1/1694; G06F 3/04817; G06F 3/0482; G06F 3/0485; G06F 2200/1637
See application file for complete search history.

(56) References Cited

U.S. PATENT DOCUMENTS

| 9,477,316 B2 | 10/2016 | Govindapillai et al. |
| 9,740,299 B2 | 8/2017 | Govindapillai et al. |
| 10,180,783 B2 | 1/2019 | Miyazaki |
| 11,392,209 B2 | 7/2022 | Govindapillai et al. |
| 2010/0004031 A1 | 1/2010 | Kim |
| 2010/0031169 A1 | 2/2010 | Jang et al. |
| 2010/0277506 A1 | 11/2010 | Yao |

(Continued)

FOREIGN PATENT DOCUMENTS

| CN | 101281443 A | 10/2008 |
| CN | 201413507 Y | 2/2010 |

(Continued)

OTHER PUBLICATIONS

European Patent Office, "Communication pursuant to Article 94 (3) EPC", issued in connection with European Patent Application No. 20191404.1, dated Oct. 18, 2023, 4 pages.

(Continued)

*Primary Examiner* — Cao H Nguyen
(74) *Attorney, Agent, or Firm* — Hanley, Flight & Zimmerman, LLC

(57) ABSTRACT

Computing devices, computer-readable storage media, and methods associated with human computer interaction. In embodiments, a computing device may include a display, a processor coupled with the display, a user interface engine and one or more applications to be operated on the processor. In embodiments, the user interface engine or the one or more applications may be configured to detect movement of the portable computing device indicating a direction a user of the portable computing device would like a portion of the user interface to move and cause the portion of the user interface to be moved, from a current location on the display to another location on the display, in accordance with the indicated direction. Such movement may facilitate the user to interact with the portion of the user interface via the interaction zone of the display. Other embodiments may be described and/or claimed.

24 Claims, 5 Drawing Sheets

Related U.S. Application Data continuation of application No. 14/993,970, filed on Jan. 12, 2016, now Pat. No. 9,740,299, which is a continuation of application No. 14/223,832, filed on Mar. 24, 2014, now Pat. No. 9,477,316.

(51) Int. Cl.
  *G06F 3/04817* (2022.01)
  *G06F 3/0482* (2013.01)
  *G06F 3/0485* (2022.01)

(52) U.S. Cl.
  CPC .......... *G06F 3/0482* (2013.01); *G06F 3/0485* (2013.01); *G06F 2200/1637* (2013.01)

(56) References Cited

U.S. PATENT DOCUMENTS

| | | |
|---|---|---|
| 2011/0081923 A1 | 4/2011 | Forutanpour et al. |
| 2011/0102455 A1 | 5/2011 | Temple |
| 2011/0115817 A1 | 5/2011 | Chun |
| 2012/0162261 A1 | 6/2012 | Kim et al. |
| 2013/0021287 A1 | 1/2013 | Endo et al. |
| 2013/0111384 A1* | 5/2013 | Kim .................... G06F 3/04817 715/765 |
| 2013/0120464 A1 | 5/2013 | Wei et al. |
| 2013/0293470 A1 | 11/2013 | Kwon |
| 2014/0040769 A1 | 2/2014 | Lazaridis et al. |
| 2014/0181739 A1* | 6/2014 | Yoo ....................... G06F 3/0488 715/800 |
| 2014/0317545 A1 | 10/2014 | Miyazaki |
| 2014/0365953 A1 | 12/2014 | Zambetti et al. |
| 2015/0220218 A1 | 8/2015 | Jeon et al. |
| 2018/0196525 A1 | 7/2018 | Govindapillai et al. |

FOREIGN PATENT DOCUMENTS

| | | |
|---|---|---|
| CN | 102096491 A | 6/2011 |
| CN | 102339203 A | 2/2012 |
| CN | 102541440 A | 7/2012 |
| CN | 102609210 A | 7/2012 |
| CN | 102681778 A | 9/2012 |
| CN | 103034450 A | 4/2013 |
| CN | 103353827 A | 10/2013 |
| CN | 103440082 A | 12/2013 |
| EP | 1607850 A3 | 2/2012 |
| EP | 2667291 A1 | 11/2013 |
| EP | 2469390 A3 | 12/2014 |
| JP | 2003140798 A | 5/2003 |
| JP | 2004164375 A | 6/2004 |
| JP | 2011221825 A | 11/2011 |
| JP | 2013073529 A | 4/2013 |
| JP | 2013114640 A5 | 6/2013 |
| JP | 2013235355 A | 11/2013 |
| JP | 2013235394 A | 11/2013 |
| JP | 2013235568 A | 11/2013 |
| JP | 2014013507 A | 1/2014 |
| KR | 20120024299 A | 3/2012 |
| KR | 102012002429 * | 3/2012 |
| KR | 20120071468 A | 7/2012 |
| KR | 20130046147 A | 5/2013 |
| KR | 20130107777 A | 10/2013 |
| KR | 20130123171 A | 11/2013 |
| KR | 20140002448 A | 1/2014 |
| WO | 2013182090 A1 | 12/2013 |
| WO | 2014003337 A1 | 1/2014 |

OTHER PUBLICATIONS

International Searching Authority, "International Search Report and Written Opinion" for PCT Patent Application No. PCT/US2015/013257, dated Apr. 15, 2015, 13 pages.

United States Patent and Trademark Office, "Final Office Action," issued in connection with U.S. Appl. No. 14/993,970 dated Feb. 1, 2017, 7 pages.

United States Patent and Trademark Office, "Non-Final Office Action," issued in connection with U.S. Appl. No. 14/993,970 dated Jul. 1, 2016, 10 pages.

United States Patent and Trademark Office, "Notice of Allowance," issued in connection with U.S. Appl. No. 14/993,970 dated Apr. 20, 2017, 5 pages.

United States Patent and Trademark Office, "Non-Final Office Action," issued in connection with U.S. Appl. No. 14/223,832 dated Dec. 16, 2015, 8 pages.

United States Patent and Trademark Office, "Notice of Allowance," issued in connection with U.S. Appl. No. 14/223,832 dated Jun. 29, 2016, 8 pages.

Japanese Patent Office, "Notice of Reasons for Rejection," issued in connection with application No. 2016-553847, dated Jul. 25, 2017, 8 pages.

European Patent Office, "Extended European Search Report," issued in connection with application No. 15769942.2 dated Oct. 20, 2017, 8 pages.

Japanese Patent Office, "Notice of Reasons for Rejection," issued in connection with application No. 2016-553847, dated Jul. 3, 2018, 13 pages.

Korean Intellectual Patent Office, "2nd Final Rejection," issued in connection with application No. 10-2016-7022399, dated Mar. 28, 2019, 5 pages. (Including English Summary).

European Patent Office, "Examination Report," issued in connection with European Patent Application No. 15 769 942.2, dated Feb. 14, 2020, 5 pages.

National Intellectual Property Administration, P.R. China, "Second Office Action," issued in connection with the Chinese Patent Application No. 201580010140.X, dated Aug. 2, 2019, 8 pages (English Translation Included).

Chinese Patent Office, "Third Office Action," issued in connection with Chinese Patent Application No. 201580010140.X, dated Mar. 20, 2020, 15 pages.

Korean Intellectual Property Office, "Notice of Preliminary Rejection," issued in connection with Korean Patent Application No. 10-2019-7018647, dated Apr. 3, 2020, 6 pages (English Summary Included).

ITOH International Patent Office, "Office Action," issued in connection with Japanese Patent Application No. JP201 9-159427, dated Nov. 10, 2020, 7 pages (English Translation).

Chinese Patent Office, "Reasons for Rejection," issued in connection with Chinese Patent Application No. 201580010140, dated Sep. 22, 2020, 11 pages (English Translation).

Korean Intellectual Property Office, "Notice of Preliminary Rejection," issued in connection with Korean Patent Application No. 10-2019-7018647, dated Oct. 29, 2020, 6 pages (English Abstract Included).

International Searching Authority, "International Search Report," issued in connection with International Application No. PCT/CN2013/077663, dated Oct. 3, 2013, 4 pages.

European Patent Office, "Communication pursuant to Article 94(3)," issued in connection with European Application No. 15769942.2, dated Feb. 23, 2021, 8 pages.

European Patent Office, "European Search Report," issued in connection with European Application No. 20191404.1, dated Nov. 24, 2020, 8 pages.

National Intellectual Property Administration, P.R. China, "Reexamination Decision," issued in connection with Chinese Patent Application No. 201580010140.x, dated Jan. 29, 2021, 2 pages (English Translation Included).

Japanese Patent Office, "Notice of Reasons for Rejection," issued in connection with Japanese Patent Application No. 2019-159427, dated Feb. 9, 2021, 7 pages (English Translation Included).

The State Intellectual Property Office of Peoples Republic of China, "Fourth Office Action," Issued in connection with Chinese Patent Application No. 201580010140.X, dated Jun. 25, 2021, 29 pages (English translation provided).

Korean Intellectual Property Office, "Final Rejection," issued in connection with Application No. 10-2019-7018647, dated May 31, 2021, 4 pages.

Japan Patent Office, "Office Action," issued in connection with Application No. 2019-159427, dated May 11, 2021, 4 pages.

(56) References Cited

OTHER PUBLICATIONS

Japanese Patent Office, "Report of Final Rejection," issued in connection with Japanese Patent Application No. 2019-159427, dated Sep. 14, 2021, 27 pages (English translation included).

The State Intellectual Property Office of Peoples Republic of China, "Fifth Office Action," issued In connection with Chinese Patent Application No. 201580010140.X, dated Sep. 18, 2021, 24 pages (English translation included).

Intellectual Property Trial and Appeal Board, "Trial Decision on Appeal against Decision to Reject Application," issued in connection with Korean Patent Application No. 2019-7018647, dated Sep. 27, 2021, 34 pages (English translation included).

National Intellectual Property Administration, P.R. China, "Notification to Grant Patent Right for Invention," issued in connection with Chinese Patent Application No. 201580010140.X, dated Dec. 22, 2021, 5 pages (English translation included).

European Patent Office, "Communication pursuant to Article 94(3) EPC," issued in connection with European Patent No. 20191404.1, dated Jun. 7, 2022, 6 pages.

European Patent Office, "Summons to attend oral proceedings pursuant to Rule 115(1) EPC," issued in connection with European Patent No. 15769942.2, dated Jun. 3, 2022, 23 pages.

United States Patent and Trademark Office, "Non-Final Office Action," issued in connection with U.S. Appl. No. 15/682,194, dated Apr. 5, 2019, 10 pages.

United States Patent and Trademark Office, "Final Office Action," issued in connection with U.S. Appl. No. 15/682,194, dated Sep. 20, 2019, 14 pages.

United States Patent and Trademark Office, "Non-Final Office Action," issued in connection with U.S. Appl. No. 15/682,194, dated Mar. 13, 2020, 10 pages.

United States Patent and Trademark Office, "Final Office Action," issued in connection with U.S. Appl. No. 15/682,194, dated Nov. 17, 2020, 14 pages.

United States Patent and Trademark Office, "Non-Final Office Action," issued in connection with U.S. Appl. No. 15/682,194, dated Jun. 24, 2021, 15 pages.

United States Patent and Trademark Office, "Final Office Action," issued in connection with U.S. Appl. No. 15/682,194, dated Oct. 28, 2021, 9 pages.

United States Patent and Trademark Office, "Notice of Allowance and Fee(s) Due," issued in connection with U.S. Appl. No. 15/682,194, dated Feb. 9, 2022, 5 pages.

United States Patent and Trademark Office, "Corrected Notice of Allowability," issued in connection with U.S. Appl. No. 15/682,194, dated Jun. 23, 2022, 2 pages.

European Patent Office, "Summons to attend oral proceedings Pursuant to Rule 115(1) EPC," issued in connection with European Patent Application No. 15769942.2, dated Jun. 3, 2022, 10 pages.

European Patent Office, "Communication pursuant to Article 94(3) EPC," issued in connection with European Patent Application No. 20191404.1, dated Jun. 7, 2022, 6 pages.

European Patent Office, "Extended European Search Report," issued in connection with European Patent Application No. 22166379.2, dated Jun. 30, 2022, 9 pages.

European Patent Office, "Decision to refuse a European patent application," issued in connection with European Patent Application No. 15769942.2, dated Aug. 5, 2022, 2 pages.

Japanese Patent Office, "Notice Concluding of Proceedings," issued in connection with Japanese Patent Application No. 2019-159427, dated Jun. 28, 2022, 2 pages (English translation provided).

Japanese Patent Office, "Trial and Appeal Decision," issued in connection with Japanese Patent Application No. 2019-159427, dated Jul. 26, 2022, 27 pages (English translation provided).

The State Intellectual Property Office of People's Republic of China, "First Office Action," issued in connection with China Patent Application No. 201580010140.X, dated Oct. 15, 2018, 21 Pages. [English translation included].

Japan Patent Office, "Search Report," issued in connection with Japan Patent Application No. 2019-159427, dated Oct. 9, 2020, 28 pages. [English translation included].

Japan Patent Office, "Notice of Reasons for Refusal," issued in connection with Japan Patent Application No. 2019-159427, dated Oct. 13, 2020, 8 pages. [English translation included].

Japan Patent Office, "Written Opinion" issued in connection with Japan Patent Application No. 2019-159427, dated Aug. 10, 2021, 9 pages. [English translation included].

Japan Patent Office, "Decision to Grant," issued in connection with Japanese Patent Application No. 2022000079, drafted Mar. 10, 2023, dated Mar. 14, 2023, 6 pages. [English translation included].

* cited by examiner

INTERACTION WITH A COMPUTING DEVICE VIA MOVEMENT OF A PORTION OF A USER INTERFACE

RELATED APPLICATIONS

This patent arises from a continuation of U.S. patent application Ser. No. 15/682,194, filed on Aug. 21, 2017, and entitled "INTERACTION WITH A COMPUTING DEVICE VIA MOVEMENT OF A PORTION OF A USER INTERFACE," which is a continuation of U.S. patent application Ser. No. 14/993,970, filed on Jan. 12, 2016, and entitled "INTERACTION WITH A COMPUTING DEVICE VIA MOVEMENT OF A PORTION OF A USER INTERFACE," which is a continuation of U.S. patent application Ser. No. 14/223,832, which was filed on Mar. 24, 2014 and was entitled "INTERACTION WITH A COMPUTING DEVICE VIA MOVEMENT OF A PORTION OF A USER INTERFACE." Priority to U.S. patent application Ser. Nos. 15/682,194, 14/993,970, and 14/223,832 is hereby claimed. U.S. application Ser. Nos. 15/682,194, 14/993,970, and 14/223,832 are hereby incorporated herein by reference in their entireties.

TECHNICAL FIELD

Embodiments of the present disclosure are related to the field of human computer interaction, and in particular, to interaction with a computing device via a display of the computing device.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Touch screens have revolutionized the market for portable computing devices. At the same time there is a constant struggle between increasing screen sizes of the portable computing devices and the usability of the computing devices. Screen sizes of portable computing devices are getting bigger and bigger, but this additional screen size may lead to cumbersome interaction with the entire screen making it hard for consumers to control the portable computing device while maintaining a consistent grip with one or more hands. This cumbersome interaction is magnified when trying to control a portable computing device with a single hand, as many consumers do. These interaction issues may provide usability drawbacks that consumers may feel they have to suffer for additional screen size of the portable computing device.

DETAILED DESCRIPTION OF ILLUSTRATIVE EMBODIMENTS

Figure 1:
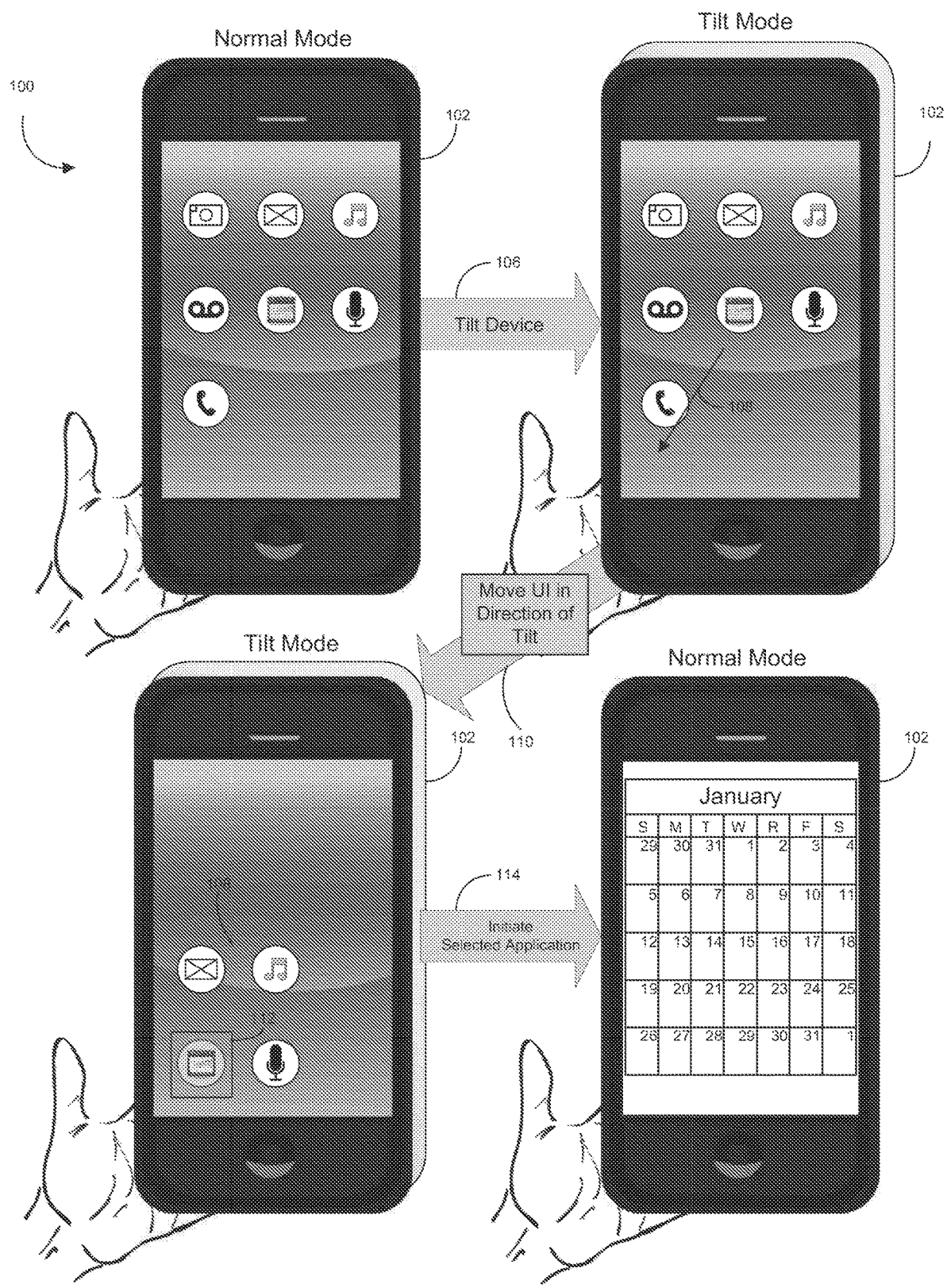
FIG. 1 depicts an illustrative user interaction with a user interface of a portable computing device, in accordance with various embodiments of the present disclosure.

Methods, storage media, and computing devices for human computer interaction are described. In embodiments, a computing device may include a display, a processor coupled with the display, one or more applications to be operated on the processor, and a user interface engine to be operated on the processor. The user interface engine or the one or more applications may be operated on the processor to detect movement of the portable computing device indicating a direction the user would like a portion of the user interface to move. In embodiments, the user interface engine or the one or more applications may cause the portion of the user interface to be moved, from a current location on the display to another location on the display, in accordance with the indicated direction. Such movement may facilitate the user of the portable computing device to interact with the portion of the user interface via the display. For example, the portable computing device may be a smart phone. The portion of the user interface may be an icon of the user interface that a user may wish to activate. In some embodiments, the user may move or rotate the smart phone in a direction to indicate the direction the user would like the user interface to move and, in response, the user interface engine may move the icon, along with the rest of the user interface in some embodiments, in the indicated direction to facilitate the user in activating the icon.

In the following detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

FIG. 1 depicts an illustrative user interaction 100 with a user interface of a portable computing device 102, in accordance with various embodiments of the present disclosure. In some embodiments, user interaction 100 may begin with a user holding a portable computing device, e.g., smart phone 102. As depicted, smart phone 102 may have an interactive display, integrated therewith, configured to render a user interface. In embodiments, portable computing device 102 may have a user interface engine, such as that described elsewhere herein, incorporated to enable portable computing device to carry out one or more of the operations described herein.

In embodiments, smart phone 102 may be configured such that a user may be able to interact with the entirety of the user interface utilizing one or more hands without the need to move the one or more hands to perform the interaction. This may be accomplished, for example, by configuring smart phone 102 to detect user input indicating a direction the user would like the user interface to move or input indicating a portion of the user interface with which the user would like to interact. As depicted here at 106, one example of input indicating a direction the user would like the user interface to move may be tilting smart phone 102 down and to the left. Such input may be detected by, for example, an accelerometer, gyroscope, camera, or any other mechanism capable of detecting movement of smart phone 102. Once such an input is detected, smart phone 102 may be configured to utilize the input to determine a direction, indicated by arrow 108, in which the user would like the user interface to move for interaction with the portion of the user interface. As depicted here, tilting smart phone 102 down and to the left may be utilized by the user to effectively indicate that the user would like the user interface to move down and to the left. Such an effect may be described as a waterfall effect, where the user may move smart phone 102 such that a portion of the user interface with which the user would like to interact may fall in the direction indicated by the input at 110 to effectively bring that portion of the user interface closer to an area of the screen with which the user may more easily interact. This may facilitate the user in interacting with the entirety of the user interface via an interactive display even where the user may not be able to reach the entirety of the display. Once the portion of the user interface the user would like to interact with is within the user's reach, e.g., by the user's thumb when operating smart phone 102 with a single hand, the user may interact with that portion. Once the portion of the user interface has moved far enough in the indicated direction for the user to interact with the portion of the user interface, the user may activate icon 112 to initiate a calendar application associated with icon 112 at 114. The user may then utilize the same process described above to interact with the user interface of the calendar application depicted.

While interactions are depicted and described above as being movement of smart phone 102 to indicate a direction the user would like a portion of the user interface to move, the particular interactions of FIG. 1 are used for illustrative purposes. In other embodiments, the user may be able to interact with the display of smart phone 102 to indicate a direction the user would like a portion of the user interface to move. For example, the user may utilize the user's thumb on an area of the display to drag a portion of the user interface into an area of the display with which the user may be able to interact more easily. Furthermore, the movement of smart phone 102 may vary from that described above. For example, the user may be able to shake, rotate, tilt, or otherwise move smart phone 102 to indicate a direction the user would like a portion of the user interface to move.

Figure 2:
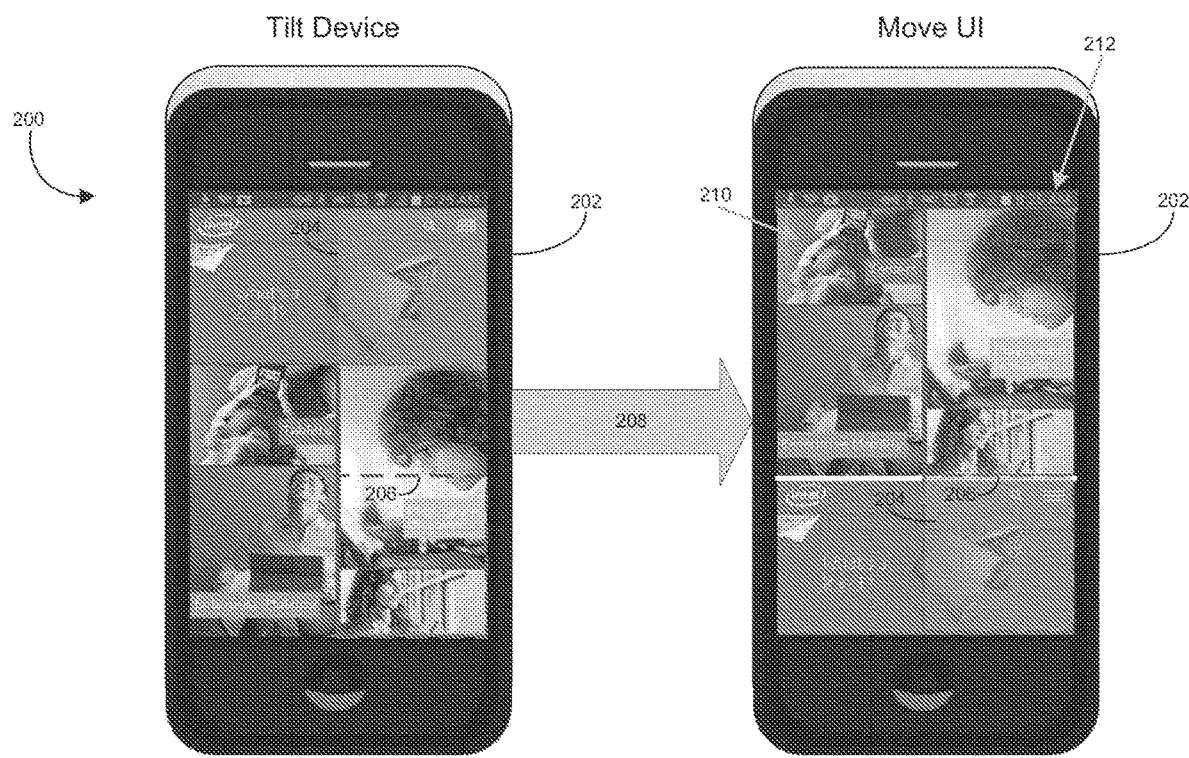
FIG. 2 depicts an illustrative utilization of an interaction zone to interact with a portion of a user interface, in accordance with various embodiments of the present disclosure.

FIG. 2 depicts an illustrative utilization of an interaction zone to interact with a portion of a user interface, in accordance with various embodiments of the present disclosure. As depicted, smart phone 202 may be integrated with an interactive display and a user interface engine configured to render a user interface on the display. In embodiments, smart phone 202 may be configured to have an interaction zone 206, or preferred area, encompassing an area of the display within which the user may interact with one or more elements of the user interface.

As depicted, smart phone 202 may be tilted in a direction, such as downward, to indicate that the user wishes to move a portion 204 of the user interface down into interaction zone 206 to interact with portion 204 via the display. In response, smart phone 202 may be configured to move portion 204 of the user interface into interaction zone 206, as indicated by arrow 208. This may be accomplished, in some embodiments, by moving the entirety of the user interface down such that the portion of the user interface with which the user would like to interact moves into interaction zone 204. In such embodiments, as the entire interface moves, a section of the interface may leave the display. In some embodiments, such as that depicted in FIG. 1 above, as the section of the user interface leaves the display the section of the user interface disappears until the user has completed the interaction with the portion of the user interface through the interaction zone, after which the user interface may return to an original, or home, position. In other embodiments, such as that depicted in FIG. 2 by section 210 of the user interface, as a section of the user interface passes off of an edge of the display that section may reemerge on an opposite edge of the display, effectively looping the user interface on the display. While depicted in FIG. 2 as being utilized in an embodiment with interaction zone 206, such looping may be utilized in embodiments without a defined interaction zone, such as that described above in reference to FIG. 1. In embodiments where the screen may loop, rather than moving the user interface back to the original location, smart phone 202 may be configured to merely continue the loop to achieve the same effect. While the user interface movement of FIG. 2 is depicted as moving the user interface of an application without moving drop down notification bar 212, this is merely for illustrative purposes only. In some embodiments, not depicted, movement of the user interface may include the entirety of the user interface including, but not limited to, drop down notification bar 212, scroll bars (not depicted), or anything else rendered on the display.

In some embodiments, the user may not need to move smart phone 202 or interact with the display to achieve movement of the portion of the user interface. For instance, smart phone 202 may be configured to detect an audible command given by the user, e.g., via a microphone (not depicted) of smart phone 202. The audible command may describe a portion of the user interface, such as a section of the user interface or specific element of the user interface with which the user would like to interact. In response to receiving such a command, smart phone 202 may be configured to move the described portion of the user interface to interaction zone 206 to facilitate the user's interaction with the user interface. In other instances, smart phone 202 may be configured to detect a portion of the user interface with which the user would like to interact by tracking eye movement of the user utilizing a camera, not depicted, integrated with smart phone 202. In such embodiments, the user may be able to look at a portion of the user interface with which the user would like to interact and that portion of the user interface may be moved into interaction zone 206 by smart phone 202 to facilitate the user's interaction with that portion of the user interface.

Figure 3:
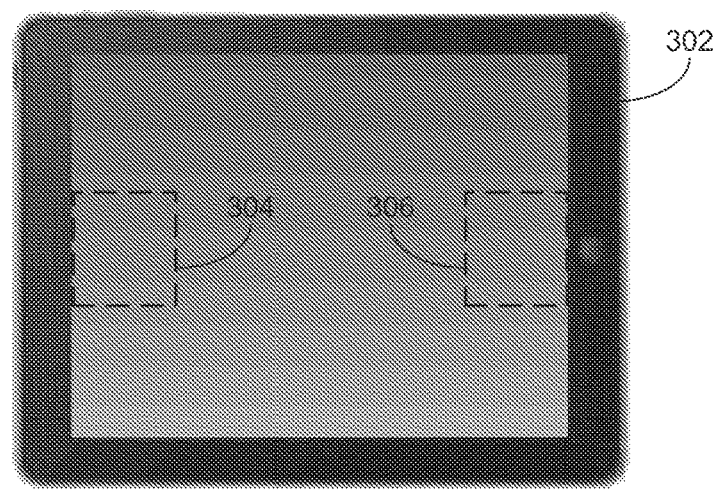
FIG. 3 depicts illustrative multiple interaction zones of a portable computing device, in accordance with various embodiments of the present disclosure.

FIG. 3 depicts possible user interaction zones of a portable computing device, in accordance with various embodiments of the present disclosure. As depicted, portable computing device, e.g., tablet 302, may have multiple interaction zones 304 and 306. These interaction zones may be determined based upon an orientation of tablet 302 and or a position of one or more of the user's hands on tablet 302. For example, as depicted, tablet 302 is in a landscape orientation. In embodiments, this orientation may be sufficient to determine that the interaction zones 304 and 306 may be in the locations depicted. In other embodiments, tablet 302 may be configured with pressure sensors to determine a position of the user hands and utilize the determined position in determining the location of interaction zones 304 and 306. For example, the user may be gripping tablet 302 in the center on either side of tablet 302 and such positioning of the hands may be utilized to determine the location of interaction zones 304 and 306. The determination of interaction zones is discussed further in reference to FIG. 5, below.

Figure 4:
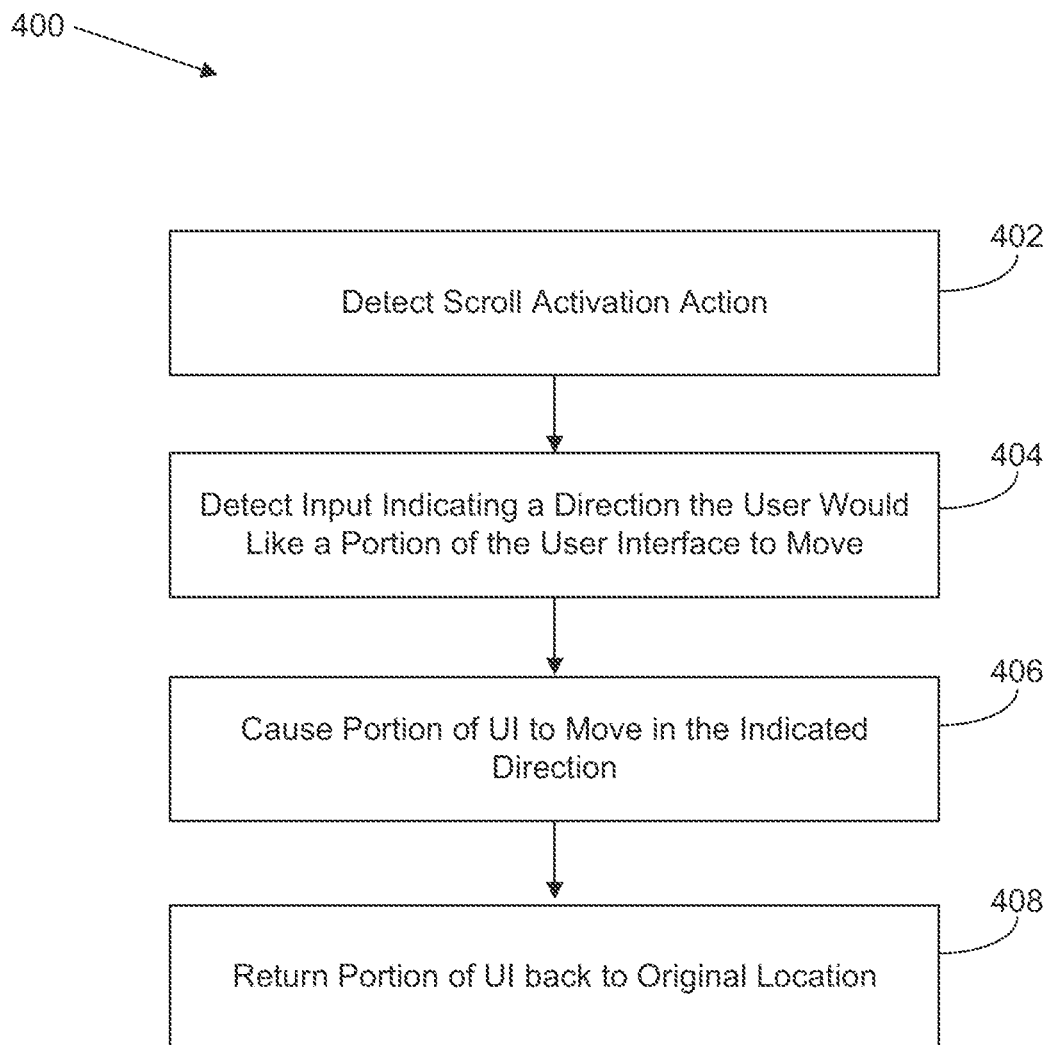
FIG. 4 depicts an illustrative process flow, in accordance with various embodiments of the present disclosure.

FIG. 4 depicts an illustrative process flow 400 of a portable computing device, in accordance with various embodiments of the present disclosure. In some embodiments, the process may optionally begin at block 402 with detection of a scroll activation action, e.g., by a user interface engine of the portable computing device. In embodiments, the scroll activation action may be utilized to prevent accidental scrolling, or movement, of a user interface by a user. Such a scroll activation action may include, but is not limited to, shaking of the portable computing device, a touch of an interactive display for a predetermined period of time, a squeeze of the portable computing device detected by one or more pressure sensors of the portable computing device, a pressing of a sequence or combination of buttons and/or soft keys of the portable computing device, a predefined gesture drawn on the interactive display by a user of the portable computing device, a covering of a camera of the portable computing device for a predetermined period of time, tilting and/or rotating the portable computing device beyond a predefined point, or any other such action capable of evincing an intent of the user to cause the user interface to move, or scroll. In other embodiments, such a scroll activation action may be unnecessary and the procedure of block 402 may be omitted.

In block 404, input indicating a direction the user would like a portion of the user interface to move may be detected, e.g., by a user interface engine of the portable computing device. Such input may, in some embodiments, include moving, e.g., tilting and/or rotating, the portable computing device. For example, the user may position the portable computing device such that a desired portion of the user interface may fall into an area of the display with which the user may more easily interact. In other embodiments, a user may utilize a finger on the display to drag the user interface in a desired direction until the portion of the user interface the user wishes to interact with is within reach. The above described inputs are merely meant to be illustrative, any input by a user that may indicate a direction the user would like a portion of the user interface to move, to facilitate the user's interaction with that portion, may be utilized without departing from the scope of this disclosure.

Once the direction the user would like a portion of the user interface to move has been determined, the portion of the user interface may be moved in the indicated direction at block 406, e.g., by a user interface engine of the portable computing device. This may be accomplished, for example, by moving the entirety of the user interface such that the portion of the user interface moves closer to an area the user is able to more easily reach on the display. In some embodiments, this may appear to the user as a jump from one location of the screen to another. In other embodiments, it may appear to the user to be a sliding of the user interface. In such embodiments, a speed of the sliding may be determined based upon a degree of tilt and/or rotation of the portable computing device, for example. In such embodiments, as the entire interface moves, a section of the interface may leave the display. In some embodiments, such as that depicted in FIG. 1 above, as the section of the user interface leaves the display the section of the display may disappear until the user has completed the interaction with the portion of the user interface, after which the user interface may return to an original, or home, position. In other embodiments, such as that depicted in FIG. 2 above, as a section of the user interface passes off of an edge of the display that section may reemerge on an opposite edge of the display, essentially looping the user interface on the display. In such embodiments, rather than moving the user interface back to the original location, the user interface may merely continue the loop to achieve the same effect.

In block 408, the portion of the user interface may be returned to a home location, e.g., by a user interface engine of the portable computing device. As used herein, the home location may be the original location of the portion of the user interface prior to the movement of block 406. In some embodiments, the procedure of block 408 may occur once the user has completed interaction with the portion of the user interface. The completion of the interaction may, in some embodiments, be determined by the user's activation of an element of the user interface, e.g., selection of an icon to initiate an associated application. In other embodiments, the completion of the interaction may be based upon a time period of inactivity or any other suitable action or inaction.

In some circumstances, a user may change the user's mind about the direction the user would like a portion of the user interface to move. In such circumstances the user may perform an action, such as adjusting the tilt or rotation to move the user interface in another direction or shaking the portable computing device, for example, to indicate a desire to discontinue the current action.

Figure 5:
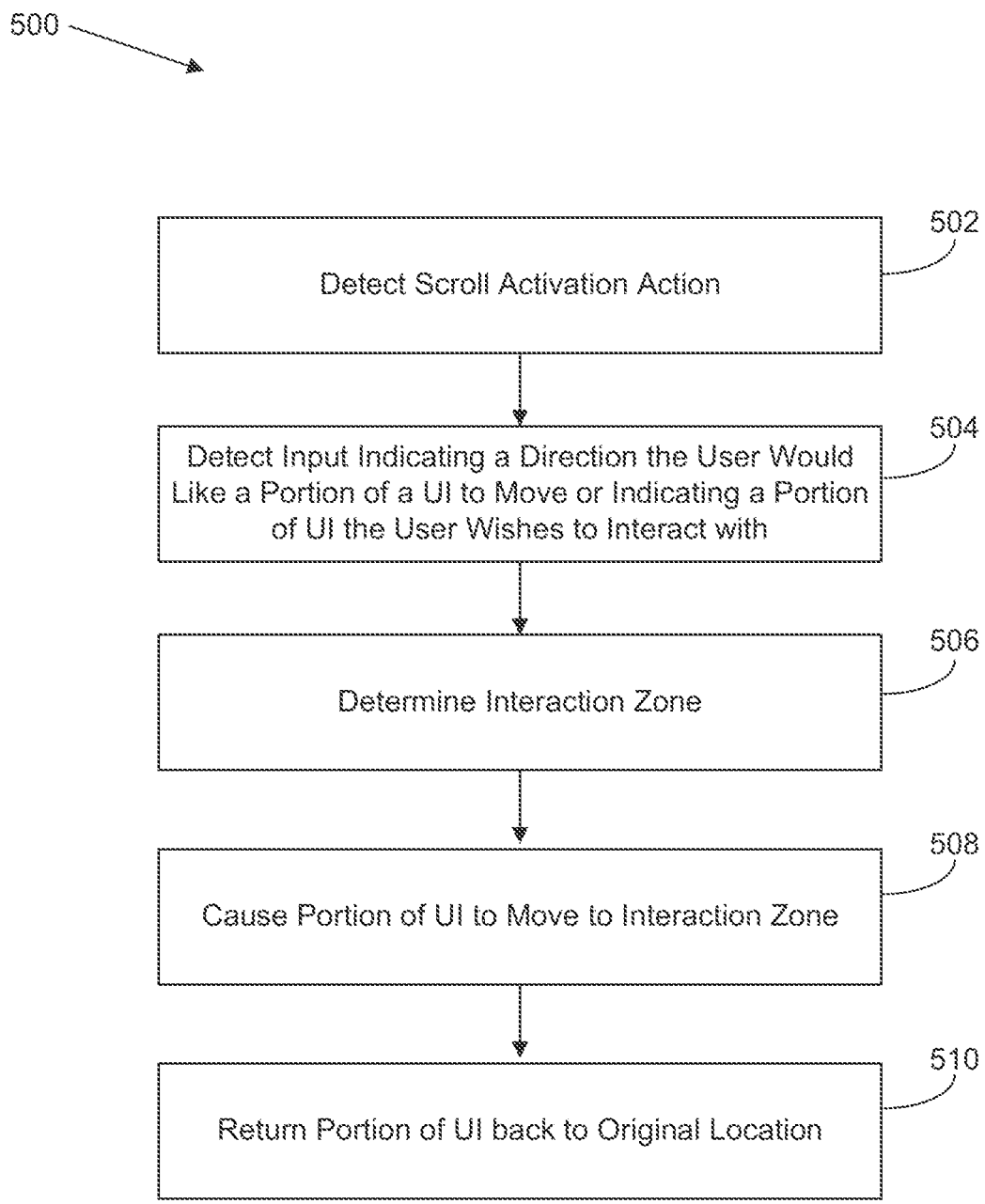
FIG. 5 depicts another illustrative process flow, in accordance with various embodiments of the present disclosure.

FIG. 5 depicts an illustrative process flow 500 of a portable computing device, in accordance with various embodiments of the present disclosure. In some embodiments, the process may optionally begin at block 502 with detection of a scroll activation action, e.g., by a user interface engine of the portable computing device. In embodiments, the scroll activation action may be utilized to prevent accidental scrolling of a user interface by a user. Such a scroll activation action may include, but is not limited to, shaking of the portable computing device, a touch of an interactive display or an interaction zone for a predetermined period of time, a squeeze of the portable computing device detected by one or more pressure sensors of the portable computing device, a pressing of a sequence of buttons and/or soft keys of the portable computing device, a predefined gesture drawn on the interactive display or the interaction zone by a user of the portable computing device, a covering of a camera of the portable computing device for a predetermined period of time, tilting and/or rotating the portable computing device beyond a predefined point, or any other such action capable of evincing an intent of the user to cause the user interface to scroll. In other embodiments, such a scroll activation action may be unnecessary and the procedure of block 502 may be omitted.

In block 504 input indicating a portion of the user interface with which the user wishes to interact may be detected, e.g., by a user interface engine of the portable computing device. Such input may, in some embodiments, include tilting and/or rotating the portable computing device. In some embodiments, portions of the user interface may be associated with different degrees of tilt and/or rotation of the portable computing device such that a change in the degree of the tilt and/or rotation may indicate a different portion of the user interface. For example, a display may be divided into a number of segments and successive rotations from a reference point, (e.g. rotations of 10 degrees) may cause the portion of the user interface with which the user wishes to interact to change from one segment to the next. In other embodiments, a user may utilize a finger on the display or an interaction zone of the display to drag the user interface until the portion of the user interface the user wishes to interact with is within the interaction zone. In still another embodiment, sections of the interaction zone may correlate with sections of the user interface and a touch of a specific section of the interaction zone may indicate that the user wishes to interact with the correlated section of the user interface. For example, if a user wishes to interact with a top right portion of the user interface then the user may touch the top right portion of the interaction zone to indicate the portion of the user interface with which the user would like to interact. The above described inputs are merely meant to be illustrative inputs, any input by a user that may indicate a portion of the user interface with which the user would like to interact may be utilized without departing from the scope of this disclosure. Furthermore, the portion of the user interface may be an area of the user interface or even a specific element or icon of the user interface.

In block 506 an interaction zone may be determined, e.g., by a user interface engine of the portable computing device. In some embodiments, the interaction zone may be determined based, at least in part, upon an orientation of the portable computing device. For example, if the portable computing device is in a portrait orientation then one interaction zone may be determined, while in a landscape orientation another interaction zone may be determined. In other embodiments, the interaction zone may be determined based upon a position of one or more of the user's hands on the portable computing device. For example, if a user is holding the portable computing device in the lower right hand corner, then the interaction zone may be determined to also be located in the lower right hand corner. In still other embodiments, the interaction zone may be determined based upon a combination of the orientation of the portable computing device and a position of one or more of the user's hands on the portable computing device. For example, if the portable computing device is being held in a landscape position and one of the user's hands is located in the lower right corner of the portable computing device then a corresponding interaction zone may be determined. In still other embodiments, the user may tap an area of the screen to identify the location that the user desires to be the interaction zone.

In further embodiments, more than one interaction zone may be determined. For example, if the portable computing device is operated with one hand on either side of the portable computing device, then an interaction zone may be determined based upon the location of each hand. In such embodiments, another determination may be made based upon the portion of the user interface that has been determined above and/or the manner of the selection. For example, in an embodiment where the user positions the computing device for a portion of the user interface to fall into an interaction zone, then an interaction zone in the path of the fall may be selected over another interaction zone where more than one interaction zone has been identified. In another example, where a user may utilize a finger on the display or the interaction zone to drag the user interface until the portion of the user interface the user wishes to interact appears in the interaction zone, the direction of the dragging may determine the interaction zone the user wishes to utilize in interacting with the portion of the user interface.

In some of these embodiments, the interaction zone may be selected from a number of possible interaction zones based upon the above described determination processes or any other suitable determination process. These possible interaction zones may be predefined in the device by the manufacturer of the device or software/firmware of the device by the software/firmware vendor. In other embodiments, the user of the device may define one or more interaction zones from which to select, along with criteria for the defined interaction zone's selection, where more than one interaction zone has been defined. For example, a user may define an interaction zone and may associate that defined interaction zone with an orientation and/or hand position for when that interaction zone may be selected. In some embodiments, a single interaction zone may be predefined and, in such embodiments, the determination of the interaction zone may be omitted. While depicted here as occurring after block 504, in some embodiments the procedure described above for block 506 may occur before that described for block 504 above.

Once the portion of the user interface the user wishes to interact with and the interaction zone have been determined, the portion of the user interface may be moved to the interaction zone at block 508, e.g., by a user interface engine of the portable computing device. This may be accomplished, as described above in reference to FIG. 2, by moving the entirety of the user interface such that the portion of the user interface may align with, or be encompassed by, the determined interaction zone. In some embodiments, this may appear to the user as a jump from one location of the screen to another. In other embodiments, it may appear to the user to be a sliding of the user interface. In such embodiments, a speed of the sliding may be determined based upon a degree of tilt and/or rotation of the portable computing device, for example. In some embodiments, the portion of the user interface may separate from a reminder of the user interface and move to the interaction zone. In such embodiments, only the portion of the user interface would move, rather than the entirety of the user interface, leaving the remainder of the user interface in the original location. In further embodiments, the entirety of the user interface may be moved such that the portion of the user interface with which the user would like to interact moves into the interaction zone. In such embodiments, as the entire interface moves, a section of the interface may leave the display. In some embodiments, such as that depicted in FIG. 1 above, as the section of the user interface leaves the display the section of the display may disappear until the user has completed the interaction with the portion of the screen through the interaction zone, after which the user interface may return to an original, or home, position. In other embodiments, such as that depicted in FIG. 2 above, as a section of the user interface passes off of an edge of the display that section may reemerge on an opposite edge of the display, essentially looping the user interface on the display. In such embodiments, rather than moving the user interface back to the original location, the user interface may merely continue the loop to achieve the same effect.

In block 510, the portion of the user interface may be returned to a home location, e.g., by a user interface engine of the portable computing device. As used herein, the home location may be the original location of the portion of the user interface prior to the movement of block 508. In some embodiments, the procedure of block 510 may occur once the user has completed interaction with the portion of the screen through the interaction zone. The completion of the interaction may, in some embodiments, be determined by the user's activation of an element of the user interface, e.g., selection of an icon to initiate an associated application. In other embodiments, the completion of the interaction may be based upon a time period of inactivity or any other suitable action or inaction.

In some circumstances, a user may change the user's mind about the portion of the user interface the user wishes to interact with or the portion may be incorrectly determined. In such circumstances the user may perform an action, such as shaking the portable computing device, to indicate a desire to discontinue the current action. Once such an action is detected the portion of the user interface may return to its home location if the movement described in reference to block 508 has begun.

Figure 6:
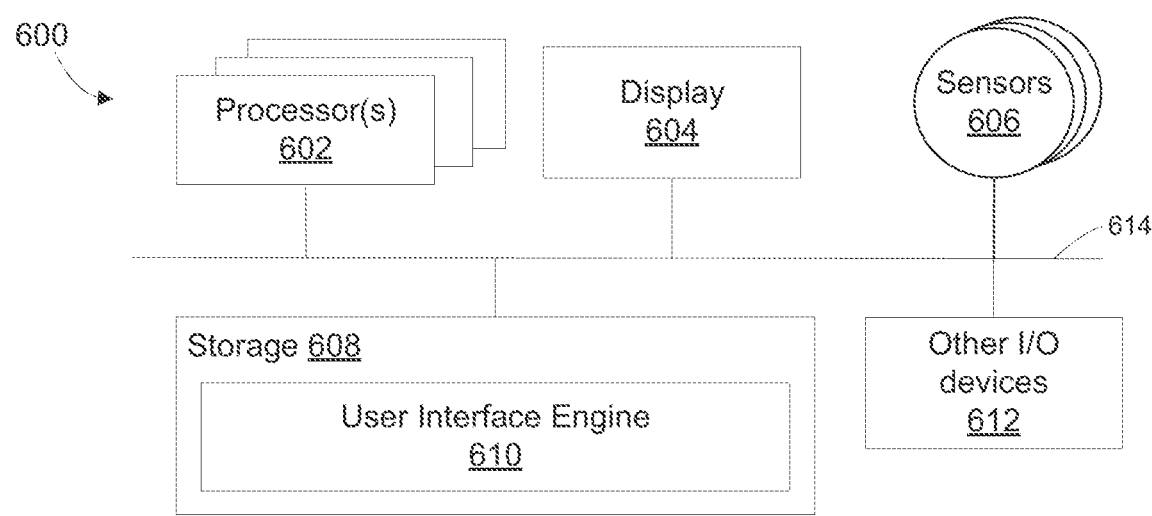
FIG. 6 depicts an illustrative configuration of a portable computing device, in accordance with various embodiments of the present disclosure.

FIG. 6 depicts an illustrative configuration of a portable computing device 600, according to some embodiments of the present disclosure. Portable computing device 600 may be any type of portable computing device, such as a smart phone, tablet, ultrabook, ebook, laptop computer, tablet/laptop hybrid, media player, or gaming device. It will be appreciated that the computing devices mentioned above are merely examples that are meant to be illustrative. This disclosure is equally applicable regardless of the computing device's form.

Portable computing device 600 may comprise processor(s) 602, display 604, Sensors 606, Storage 608 containing user interface engine 610, and other input/output (I/O) devices 612. Processor(s) 602, display 604, sensors 606, storage 608 and other input/output (I/O) devices 612 may all be coupled together utilizing system bus 614.

Processor(s) 602 may be comprised of a single processor or multiple processors. In multiple processor embodiments, the multiple processors may be of the same type, i.e. homogeneous, or may be of differing types, i.e. heterogeneous and may include any type of single or multi-core processors. This disclosure is equally applicable regardless of type and/or number of processors.

Display 604 may be any type of display including, a liquid crystal diode (LCD), an organic light emitting diode (OLED), a plasma display or any other similar display. In embodiments, display 604 may be an interactive display such as a touch sensitive display.

Display 604 may be incorporated into computing device 600 or may be peripherally connected to computing device 600 through any type of wired and/or wireless connection. This disclosure is equally applicable regardless of the type of display.

Sensors 606 may include, in some embodiments, sensors such as a camera, accelerometer, gyroscope, pressure sensors, etc. These sensors may enable computing device 600 to carry out one or more of the processes described above in reference to FIGS. 1-5. It will be appreciated that the sensors mentioned above are merely examples that are meant to be illustrative.

In embodiments, storage 608 may be any type of computer-readable storage medium or any combination of differing types of computer-readable storage media. Storage 608 may include volatile and non-volatile/persistent storage. Volatile storage may include e.g., dynamic random access memory (DRAM). Non-volatile/persistent storage may include, but is not limited to, a solid state drive (SSD), a magnetic or optical disk hard drive, flash memory, or any multiple or combination thereof.

In embodiments user interface engine 610 may be implemented as software, firmware, or any combination thereof. In some embodiments, user interface engine 610 may comprise one or more instructions that, when executed by processor(s) 602, cause computing device 600 to perform one or more operations of any process described herein. In embodiments, user interface engine 610 may be configured to receive data from sensors 606. In some embodiments, user interface engine 610 may be configured to monitor a stream of data produced by sensors 606. In other embodiments, user interface engine 610 may be configured to periodically receive portions of data from sensors 606 for analysis. In some embodiments, user interface engine 610 may be configured to determine a direction the user would like a portion of the user interface to move or determine a portion of the user interface with which the user would like to interact, as described above, but may output these determinations to another application or an operating system (OS) of the portable computing device to have the actual movement of the user interface accomplished. This may be accomplished in some embodiments, through an application programming interface (API) integrated into user interface engine 610.

In embodiments, user interface engine 610 may be configured to analyze the data received from sensors 606. In some embodiments, the data may be analyzed to determine a position of a user's hand(s) and/or finger(s) on computing device 600. In some embodiments, the data may be analyzed to determine if a pre-determined action occurs within the sensor data, such as those actions described in reference to FIGS. 1-5. This may be accomplished, for example, by comparing data captured by one or more of the sensors with a database of predefined actions.

For the purposes of this description, a computer-usable or computer-readable medium can be any medium that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Embodiments of the disclosure can take the form of an entirely hardware embodiment, an entirely software embodiment or an embodiment containing both hardware and software elements. In various embodiments, software, may include, but is not limited to, firmware, resident software, microcode, and the like. Furthermore, the disclosure can take the form of a computer program product accessible from a computer-usable or computer-readable medium providing program code for use by or in connection with a computer or any instruction execution system.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the disclosure. This application is intended to cover any adaptations or variations of the embodiments discussed herein. Therefore, it is manifestly intended that the embodiments of the disclosure be limited only by the claims and the equivalents thereof.

Examples

Some non-limiting examples are:

Example 1 is a portable computing device to facilitate user interaction with a user interface comprising: a display, a processor coupled with the display, one or more applications operated on the processor, and a user interface engine. The user interface engine is to be operated on the processor to render a user interface of the one or more applications on the display. The user interface engine or the one or more applications are further operated by the processor to: detect movement of the portable computing device indicating a direction a user of the portable computing device would like a portion of the user interface to move; and cause the portion of the user interface to be moved, from a current location on the display to another location on the display, in accordance with the indicated direction, to facilitate the user to interact with the portion of the user interface.

Example 2 may include the subject matter of Example 1, wherein the user interface engine or the one or more applications are further to be operated on the processor to cause the portion of the user interface to return to the current location from the another location upon completion of the user's interaction with the portion of the user interface.

Example 3 may include the subject matter of Example 1, wherein movement of the portable computing device comprises at least one of tilt or rotation of the portable computing device.

Example 4 may include the subject matter of Example 3, wherein the portable computing device further comprises a movement sensor configured to detect and output data concerning movement of the portable computing device, and wherein detection of movement of the portable computing device is based at least in part on the data output by the movement sensor.

Example 5 may include the subject matter of Example 4, wherein the movement sensor comprises at least one of an accelerometer or a gyroscope.

Example 6 may include the subject matter of any one of Examples 1-5, wherein the another location comprises an interaction zone of the display.

Example 7 may include the subject matter of Example 6, wherein the interaction zone comprises a fixed area of the display.

Example 8 may include the subject matter of Example 6, wherein the user interface engine is further operated on the processor to determine the interaction zone.

Example 9 may include the subject matter of Example 8, wherein determination of the interaction zone comprises selection of the interaction zone from one or more areas of the display based upon an orientation of the portable computing device.

Example 10 may include the subject matter of Example 9, wherein the one or more areas of the display are predefined by the user of the portable computing device.

Example 11 may include the subject matter of Example 10, wherein the one or more areas of the display predefined by the user enable the user to interact with the entire user interface via the interaction zone with one hand while holding the portable computing device with the one hand.

Example 12 may include the subject matter of Example 8, wherein to determine the interaction zone comprises to determine the interaction zone based on movement of the portable computing device.

Example 13 may include the subject matter of Example 8, wherein to determine the interaction zone comprises determination of an area of the display of the portable computing device with which the user may interact given a current position of one or more of the user's hands on the portable computing device.

Example 14 may include the subject matter of Example 13, wherein to determine the interaction zone comprises: to determine a position of one or more of the user's hands on the portable computing device; and to determine the interaction zone based on the determined position.

Example 15 may include the subject matter of any one of Examples 1-5, wherein the portion of the user interface is an interactive element of the user interface.

Example 16 may include the subject matter of any one of Examples 1-5, wherein to detect movement of the portable computing device is further to only detect movement of the portable computing device on detection of a predefined scroll activation action.

Example 17 may include the subject matter of any one of Examples 1-5, wherein to cause the portion of the user interface to move from the current location to the another location is to scroll the entire user interface to move the portion of the user interface from the current location to the another location.

Example 18 may include the subject matter of any one of Examples 1-5, wherein the portable computing device is one of a smart phone, tablet, personal digital assistant (PDA), tablet-laptop hybrid, media player, or gaming device.

Example 19 is a computer implemented method for facilitating user interaction with a user interface comprising: detecting, by a user interface engine of a portable computing device, movement of the portable computing device indicating a direction a user of the portable computing device would like a portion of the user interface to move; and causing, by the user interface engine, the portion of the user interface to be moved, from a current location on the display to another location on the display, in accordance with the indicated direction, to facilitate the user of the portable computing device in interacting with the portion of the user interface.

Example 20 may include the subject matter of Example 19, wherein causing the portion of the user interface to be moved in accordance with the indicated direction comprises outputting, by the user interface engine, of an indicator of the indicated direction to an operating system (OS) or an application of the computing device for use by the OS or the application to move the portion of the user interface in accordance with the indicated direction.

Example 21 may include the subject matter of Example 20, further comprising returning, by the user interface engine, the portion of the user interface to the current location from the another location upon completion of the user's interaction with the portion of the user interface.

Example 22 may include the subject matter of Example 19, wherein movement of the portable computing device comprises at least one of tilt or rotation of the portable computing device.

Example 23 may include the subject matter of Example 22, wherein detecting movement of the portable computing device is based at least in part on data output by an accelerometer or a gyroscope of the portable computing device.

Example 24 may include the subject matter of any one of Examples 19-23, wherein the another location comprises an interaction zone of the display.

Example 25 may include the subject matter of Example 24, wherein the interaction zone comprises a fixed area of the display.

Example 26 may include the subject matter of Example 24, further comprising determining, by the user interface engine, the interaction zone.

Example 27 may include the subject matter of Example 26, wherein determining the interaction zone comprises selecting the interaction zone from one or more areas of the display based upon an orientation of the portable computing device.

Example 28 may include the subject matter of Example 27, wherein the one or more areas of the display are predefined by the user of the portable computing device.

Example 29 may include the subject matter of Example 27, wherein the one or more areas of the display predefined by the user enable the user to interact with the entire user interface via the interaction zone with one hand while holding the portable computing device with the one hand.

Example 30 may include the subject matter of Example 26, wherein determining the interaction zone is based at least in part on movement or rotation of the portable computing device.

Example 31 may include the subject matter of Example 26, wherein determining the interaction zone comprises determining an area of the display of the portable computing device with which the user may interact given a current position of one or more of the user's hands on the portable computing device.

Example 32 may include the subject matter of Example 31, wherein determining the interaction zone comprises: determining a position of one or more of the user's hands on the portable computing device; and determining the interaction zone based on the determined position.

Example 33 may include the subject matter of any one of Examples 19-23, wherein the portion of the user interface is an interactive element of the user interface.

Example 34 may include the subject matter of any one of Examples 19-23, wherein detecting movement of the portable computing device comprises only detecting movement of the portable computing device on detecting a predefined scroll activation action.

Example 35 may include the subject matter of any one of Examples 19-23, wherein causing the portion of the user interface to move from the current location to the another location comprises scrolling the entire user interface to move the portion of the user interface from the current location to the another location.

Example 36 is at least one computer-readable storage medium having instructions to facilitate user interaction with a portion of a user interface stored thereon which, when executed by a portable computing device, cause the portable computing device to carry out the method of any one of Examples 19-35.

Example 37 is an apparatus to facilitate user interaction with a user interface comprising: means for detecting movement of the computing apparatus indicating a direction the user of the computing apparatus would like a portion of the user interface to move; and means for causing the portion of the user interface to be moved, from a current location on a display to another location on the display, in accordance with the indicated direction, to facilitate the user of the apparatus in interacting with the portion of the user interface.

Example 38 may include the subject matter of Example 37, wherein means for causing the portion of the user interface to be moved in accordance with the indicated direction further comprises means for outputting of an indicator of the indicated direction to an operating system (OS) or an application of the computing device for use by the OS or the application to move the portion of the user interface in accordance with the indicated direction.

Example 39 may include the subject matter of Example 38, further comprising means for returning, by the user interface engine, the portion of the user interface to the current location from the another location upon completion of the user's interaction with the portion of the user interface.

Example 40 may include the subject matter of Example 37, wherein movement of the apparatus comprises at least one of tilt or rotation of the apparatus.

Example 41 may include the subject matter of Example 40, wherein detecting movement of the apparatus is based at least in part on data output by an accelerometer or a gyroscope of the apparatus.

Example 42 may include the subject matter of any one of Examples 37-41, wherein the another location comprises an interaction zone of the display.

Example 43 may include the subject matter of Example 42, wherein the interaction zone comprises a fixed area of the display.

Example 44 may include the subject matter of Example 42, further comprising means for determining the interaction zone.

Example 45 may include the subject matter of Example 44, wherein means for determining the interaction zone comprises means for selecting the interaction zone from one or more areas of the display based upon an orientation of the apparatus.

Example 46 may include the subject matter of Example 45, wherein the one or more areas of the display are predefined by the user of the apparatus.

Example 47 may include the subject matter of Example 45, wherein the one or more areas of the display predefined by the user enable the user to interact with the entire user interface via the interaction zone with one hand while holding the apparatus with the one hand.

Example 48 may include the subject matter of Example 44, wherein determining the interaction zone is based at least in part on movement or rotation of the apparatus.

Example 49 may include the subject matter of Example 44, wherein determining the interaction zone comprises means for determining an area of the display of the apparatus with which the user may interact given a current position of one or more of the user's hands on the apparatus.

Example 50 may include the subject matter of Example 49, wherein determining the interaction zone comprises: means for determining a position of one or more of the user's hands on the apparatus; and means for determining the interaction zone based on the determined position.

Example 51 may include the subject matter of any one of Examples 37-41, wherein the portion of the user interface is an interactive element of the user interface.

Example 52 may include the subject matter of any one of Examples 37-41, further comprising means for detecting a predefined scroll activation action and wherein detecting movement of the apparatus comprises only detecting movement of the apparatus on detecting the predefined scroll activation action.

Example 53 may include the subject matter of any one of Examples 37-41, wherein means for causing the portion of the user interface to move from the current location to the another location comprises means for scrolling the entire user interface to move the portion of the user interface from the current location to the another location.

Example 54 is at least one computer-readable storage medium having instructions stored thereon which, when executed by a portable computing device, cause the portable computing device to: detect movement of the portable computing device indicating a direction a user of the portable computing device would like a portion of the user interface to move; and cause the portion of the user interface to be moved, from a current location on the display to another location on the display, in accordance with the indicated direction, to facilitate the user of the portable computing device in interacting with the portion of the user interface.

Example 55 may include the subject matter of Example 54, wherein to cause the portion of the user interface to be moved in accordance with the indicated direction comprises output of an indicator of the indicated direction to an operating system (OS) or an application of the computing device for use by the OS or the application to move the portion of the user interface in accordance with the indicated direction.

Example 56 may include the subject matter of Example 55, wherein the instructions, when executed by the portable computing device, further cause the portable computing device to return the portion of the user interface to the current location from the another location upon completion of the user's interaction with the portion of the user interface. Example 57 may include the subject matter of Example 54, wherein movement of the portable computing device comprises at least one of tilt or rotation of the portable computing device.

Example 58 may include the subject matter of Example 57, wherein to detect movement of the portable computing device is based at least in part on data output by an accelerometer or a gyroscope of the portable computing device.

Example 59 may include the subject matter of any one of Examples 54-58, wherein the another location comprises an interaction zone of the display.

Example 60 may include the subject matter of Example 59, wherein the interaction zone comprises a fixed area of the display.

Example 61 may include the subject matter of Example 59, further comprising determining, by the user interface engine, the interaction zone.

Example 62 may include the subject matter of Example 61, wherein to determine the interaction zone comprises selecting the interaction zone from one or more areas of the display based upon an orientation of the portable computing device.

Example 63 may include the subject matter of Example 62, wherein the one or more areas of the display are predefined by the user of the portable computing device.

Example 64 may include the subject matter of Example 62, wherein the one or more areas of the display predefined by the user enable the user to interact with the entire user interface via the interaction zone with one hand while holding the portable computing device with the one hand.

Example 65 may include the subject matter of Example 61, wherein to determine the interaction zone is based at least in part on movement or rotation of the portable computing device.

Example 66 may include the subject matter of Example 61, wherein to determine the interaction zone is based at least in part on a current position of one or more of the user's hands on the portable computing device.

Example 67 may include the subject matter of Example 66, wherein to determine the interaction zone comprises: determination of a position of one or more of the user's hands on the portable computing device; and determination of the interaction zone based on the determined position.

Example 68 may include the subject matter of any one of Examples 54-58, wherein the portion of the user interface is an interactive element of the user interface. Example 69 may include the subject matter of any one of Examples 54-58, wherein the instructions, when executed by the portable computing device, further cause the portable computing device to detect a predefined scroll activation action and wherein to detect movement of the portable computing device is based on the detection of the predefined scroll activation action.

Example 70 may include the subject matter of any one of Examples 54-58, wherein to move the portion of the user interface is to scroll the entire user interface to move the portion of the user interface from the current location to the another location.

What is claimed is:

1. At least one non-transitory computer-readable storage medium having instructions stored thereon which, when executed by a computing device, cause the computing device to:
   cause a user interface to be presented at a first location on an interactive display;
   detect a user interaction with the computing device, the user interaction indicative of a direction from the first location towards a second location that a user of the computing device would like a portion of the user interface to move;
   cause the portion of the user interface to be moved, from the first-location on the interactive display to the second location on the interactive display, in accordance with the indicated direction, to facilitate the user of the computing device in interaction with the portion of the user interface, the user interface to be presented at the second location such that a lowest portion of the user interface is not presented on the interactive display; and
   cause the portion of the user interface to be moved, from the second location on the interactive display to the first location on the interactive display, after a time period.

2. A device comprising:
   an interactive display having a top and a bottom; and
   processor circuitry to:
   cause a user interface to be presented at a first location on the interactive display;
   detect a user interaction with the interactive display, the user interaction indicative of a movement direction to cause the user interface to be presented at a second location on the interactive display;
   cause the user interface to be presented at the second location in accordance with the indicated movement direction, a top of the user interface closer to the bottom of the interactive display with the user interface in the second location than in the first location, the user interface including a first portion and a second portion, the second portion of the user interface not presented when the user interface is in the second location; and cause the user interface to be presented at the first location on the interactive display after a time period.

3. The device of claim 2, further including a housing.

4. The device of claim 2, further including a camera.

5. The device of claim 2, wherein the device is a consumer device.

6. A device comprising:

an interactive display having a top and a bottom; and processor circuitry to:

detect a user interaction with the interactive display, the user interaction to cause a user interface of the interactive display to move in a direction from a first location relative to the top of the interactive display to a second location relative to the top of the interactive display;

cause the user interface of the interactive display to move from the first location on the interactive display to a second location on the interactive display in accordance with the indicated direction, the second location closer to the bottom of the interactive display than the first location, wherein the user interface includes a first portion and a second portion, the second portion of the user interface is presented on the interactive display only when the user interface is presented in the first location; and cause the user interface to move from the second location on the interactive display to the first location on the interactive display after a time period.

7. The device of claim 6, further including a microphone.

8. The device of claim 6, further including an output device.

9. The device of claim 6, further including a camera.

10. The device of claim 9, wherein the interactive display is positioned on a first side of a housing of the device, and a camera is directed away from a second side of the housing opposite the first side of the housing.

11. The device of claim 6, further including memory.

12. The device of claim 6, wherein the device is portable.

13. The device of claim 6, wherein the device is a computing device.

14. The device of claim 6, wherein the device is a consumer device.

15. The device of claim 6, wherein the user interaction with the interactive display includes a sequence of taps on at least one of a button or a soft key.

16. The device of claim 15, wherein the sequence of taps includes two taps.

17. The device of claim 6, wherein the interactive display is movable.

18. The device of claim 6, wherein the interactive display is positioned on a first side of a housing of the device, and a camera is positioned on a second side of the housing opposite the first side of the housing.

19. The device of claim 6, further including a rectangular housing.

20. A device comprising:

an interactive display having a top and a bottom;

means for presenting a user interface at a first location on the interactive display;

means for detecting a user interaction with the interactive display, the user interaction to cause the user interface to be moved in a direction towards a second location on the interactive display; and means for causing a user interface of the interactive display to move from the first location relative to the top of the interactive display to the second location relative to the top of the interactive display, the second location closer to the bottom of the interactive display than the first location, the user interface to be presented at the second location such that a lowest portion of the user interface is not presented on the interactive display, the means for causing to cause the user interface to move from the second location on the interactive display to the first location on the interactive display after a time period.

21. The device of claim 20, further including a microphone.

22. The device of claim 20, further including an output device.

23. The device of claim 20, further including a camera.

24. The device of claim 23, wherein the camera is directed in a first direction, the interactive display is directed in a second direction, and the first and second directions are opposite directions.

* * * * *